(12) United States Patent
Lüchinger

(10) Patent No.: US 12,448,565 B2
(45) Date of Patent: Oct. 21, 2025

(54) SOLID POLYMER COMPOSITION, A SELF-SUPPORTING FILM AND A LIGHT EMITTING DEVICE

(71) Applicant: Avantama AG, Stäfa (CH)

(72) Inventor: Norman Albert Lüchinger, Meilen (CH)

(73) Assignee: Avantama AG, Stäfa (CH)

( * ) Notice: Subject to any disclaimer, the term of this patent is extended or adjusted under 35 U.S.C. 154(b) by 425 days.

(21) Appl. No.: 17/773,090

(22) PCT Filed: Jul. 5, 2021

(86) PCT No.: PCT/EP2021/068523
§ 371 (c)(1),
(2) Date: Apr. 29, 2022

(87) PCT Pub. No.: WO2022/008451
PCT Pub. Date: Jan. 13, 2022

(65) Prior Publication Data
US 2024/0141229 A1    May 2, 2024

(30) Foreign Application Priority Data
Jul. 7, 2020   (EP) ..................... 20184584

(51) Int. Cl.
*H10K 50/115* (2023.01)
*C08F 122/10* (2006.01)
(Continued)

(52) U.S. Cl.
CPC .......... *C09K 11/664* (2013.01); *C08F 122/10* (2013.01); *C09K 11/06* (2013.01);
(Continued)

(58) Field of Classification Search
CPC ..... C09K 11/664; C09K 11/66; C09K 11/665; C09K 11/06; C09K 11/623; C09K 11/70;
(Continued)

(56) References Cited

U.S. PATENT DOCUMENTS 10,775,671 B2    9/2020   Lüchinger et al.
2017/0186922 A1*  6/2017   Kim .................. G02F 1/133514
(Continued)

FOREIGN PATENT DOCUMENTS

JP    2011189508 A    9/2011
JP    2019502954 A    1/2019
(Continued)

OTHER PUBLICATIONS

International Search Report for corresponding International Patent Application No. PCT/EP2021/068523 mailed on Sep. 8, 2021.

*Primary Examiner* — Matthew E. Hoban
*Assistant Examiner* — Lynne Edmondson
(74) *Attorney, Agent, or Firm* — Renner, Otto, Boisselle & Sklar, LLP

(57) ABSTRACT

The invention refers in a first aspect to self-supporting film comprising green luminescent crystals (1), red luminescent crystals (2), and a polymer (3). The green luminescent crystals (1) are perovskite crystals. The red luminescent crystals (2) are zincblende or wurzite, preferably zincblende, crystals. A second aspect of the invention refers to a solid polymer composition (100). A third aspect of the invention refers to a light emitting device comprising either the solid polymer composition (100) or the self-supporting film.

18 Claims, 3 Drawing Sheets

(51) Int. Cl.
  *C09K 11/06* (2006.01)
  *C09K 11/62* (2006.01)
  *C09K 11/66* (2006.01)
  *C09K 11/70* (2006.01)
  *C09K 19/38* (2006.01)

(52) U.S. Cl.
  CPC ............ *C09K 11/623* (2013.01); *C09K 11/70* (2013.01); *C09K 19/3838* (2013.01)

(58) Field of Classification Search
  CPC ..... C09K 11/025; C09K 11/02; C09K 11/565; C09K 11/883; C08F 122/10; H10K 50/115; H10K 50/805; H05B 33/14; H05B 33/20
  See application file for complete search history.

(56) References Cited

U.S. PATENT DOCUMENTS

| | | | |
|---|---|---|---|
| 2019/0153313 A1 | 5/2019 | Lüchinger et al. | |
| 2020/0165397 A1 | 5/2020 | Arimura et al. | |
| 2021/0380820 A1* | 12/2021 | Harada | C09D 4/00 |

FOREIGN PATENT DOCUMENTS

| | | | |
|---|---|---|---|
| JP | 2019048937 A | 3/2019 |
| JP | 2019526658 A | 9/2019 |
| JP | 2020070444 A | 5/2020 |
| WO | 2017086362 A1 | 5/2017 |
| WO | 2017108568 A1 | 6/2017 |
| WO | 2017195062 A1 | 11/2017 |
| WO | 2018146561 A1 | 8/2018 |
| WO | 2020130592 A1 | 6/2020 |

\* cited by examiner

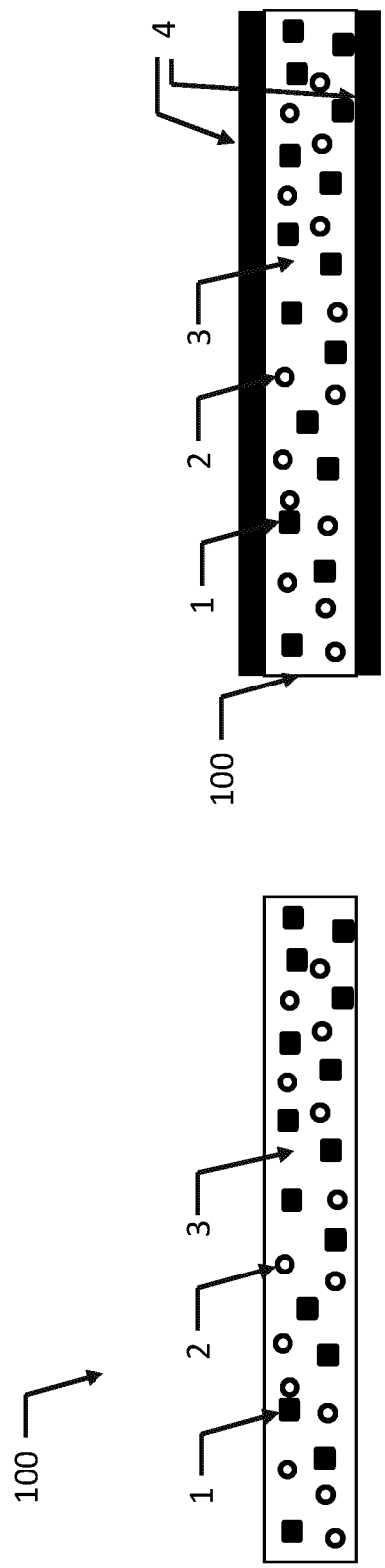

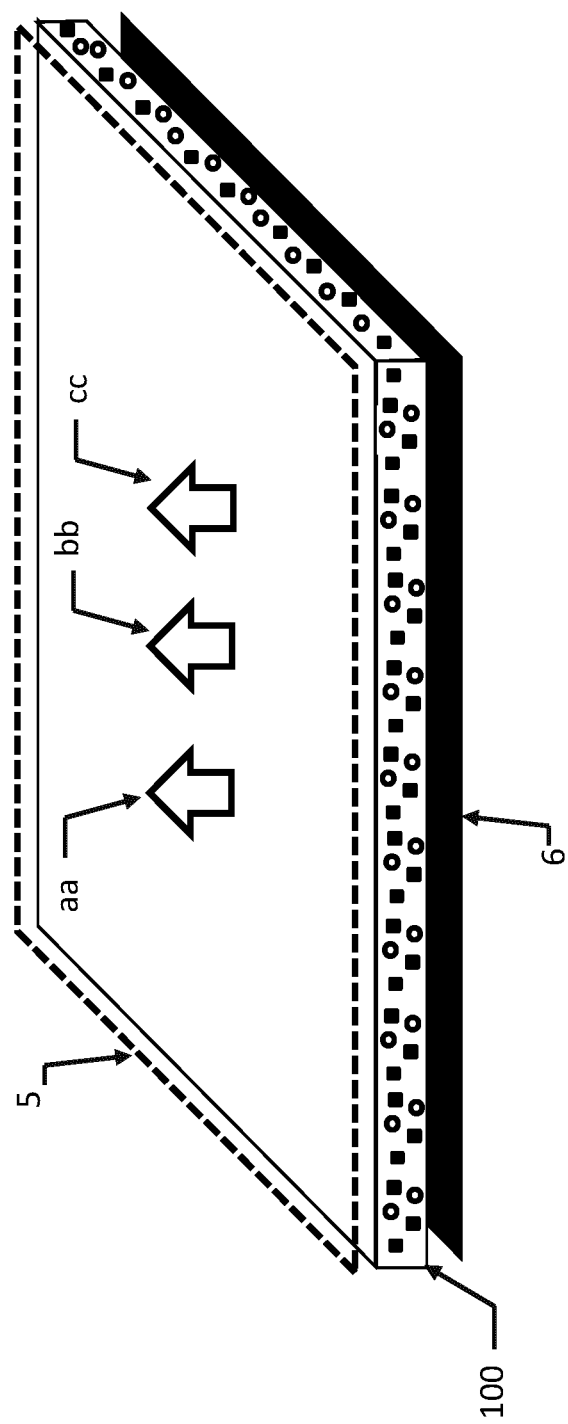

SOLID POLYMER COMPOSITION, A SELF-SUPPORTING FILM AND A LIGHT EMITTING DEVICE

This application is a national phase of International Application No. PCT/EP2021/068523 filed Jul. 5, 2021, which claims priority to European Patent Application No. 20184584.9 filed Jul. 7, 2020, the disclosures of which are hereby incorporated herein by reference in their entirety.

TECHNICAL FIELD

The invention relates to a solid polymer composition, a self-supporting film comprising the solid-polymer composition, and a light emitting device comprising the solid polymer composition or the self-supporting film.

BACKGROUND ART

State-of-the-art liquid crystal displays (LCD) or display components comprise luminescent crystal (quantum dot) based components. In particular, a backlight component of such a LCD might comprise a RGB backlight consisting of a red, a blue and a green light. Today, typically luminescent crystals (quantum dots) are used to produce the backlight colours of such a backlight component.

Document US 2017/186922 A1 discloses an electronic device including a light source having a peak emission at a wavelength between about 440 nm to about 480 nm; and a photoconversion layer disposed on the light source. The photoconversion layer includes a first quantum dot which emits red light and a second quantum dot which emits green light. At least one of the first quantum dot and the second quantum dot has a perovskite crystal structure and includes a compound represented by Chemical Formula 1: $AB'X_{3+a}$, wherein A is a Group IA metal, $NR_4^+$, or a combination thereof, B' is a Group IVA metal, X is a halogen, $BF_4^-$, or a combination thereof, and a is 0 to 3.

Document WO 2017/195062 A1 discloses devices and systems including a material including a halide perovskite and/or phosphor to produce and/or communicate using visible light, and the like.

Document WO 2018/146561 A1 discloses compositions and methods relating to light converting luminescent composite material.

Document WO 2017/108568 A1 discloses a luminescent component comprises a first film comprising a first solid polymer composition and a second film comprising a second solid polymer composition. The first solid polymer composition comprises first luminescent crystals. The second solid polymer composition comprises second luminescent crystals. The first luminescent crystals are of size between 3 nm and 3000 nm, and emit red light in response to excitation by light with a shorter wavelength. The second luminescent crystals are of size between 3 nm and 3000 nm, and emit green light in response to excitation by light with a shorter wavelength.

Document WO 2020/130592 A1 relates to a metal halide perovskite light emitting device and a method for manufacturing same. The metal halide perovskite light emitting device, according to the present invention, uses, as a light emitting layer, a perovskite film having a multidimensional crystal structure derived by a proton transfer reaction so that ion transfer is suppressed by a self-assembled shell and a surface defect is removed, thereby improving photoluminescence intensity, light emitting efficiency, and lifetime. Also, a highly efficient light emitting device can be manufactured by injecting a fluorine-based material and a basic material into a PEDOT:PSS conductive polymer, which has been used as a hole injection layer, so as to adjust the acidity thereof and improve the work function of an interface, and by protecting an electrode vulnerable to acid by means of a chemically stable graphene barrier layer.

The manufacturing of such components faces various challenges. One challenge is the embedding of the luminescent crystals into the component. Due to the different chemical properties of the luminescent crystals, there might be incompatibilities between the various embedded materials comprising the luminescent crystals or even between luminescent crystals embedded within the same material. Such incompatibilities might lead to degradation of the materials in the display components and therefore the lifetime of such a display might be affected.

In addition, luminescent crystal based components often deal with challenges regarding stability and brightness, wherein a good stability and high display brightness of these components is difficult to achieve.

DISCLOSURE OF THE INVENTION

The problem to be solved by the present invention is to overcome the disadvantages of the prior art. In particular, the present invention overcomes the disadvantages of the prior art in terms of stability and brightness.

Unless otherwise stated, the following definitions shall apply in this specification:

The terms "a", "an" "the" and similar terms used in the context of the present invention are to be construed to cover both the singular and plural unless otherwise indicated herein or clearly contradicted by the context. The term "containing" shall include all, "comprising", "essentially consisting of" and "consisting of". Percentages are given as weight-%, unless otherwise indicated herein or clearly contradicted by the context. "Independently" means that one substituent/ion may be selected from one of the named substituents/ions or may be a combination of more than one of the above.

The term "luminescent crystal" (LC) is known in the field and in the context of the present invention relates to crystals of 2-100 nm, made of semiconductor materials. The term comprises quantum dots, typically in the range of 2-10 nm and nanocrystals, typically in the range of 10-100 nm.

LCs show, as the term indicates, luminescence. In the context of the present invention the term luminescent crystal includes both, single crystals and polycrystalline particles. In the latter case, one particle may be composed of several crystal domains (grains), connected by crystalline or amorphous phase boundaries. A luminescent crystal is a semiconducting material which exhibits a direct bandgap (typically in the range 1.1-3.8 eV, more typically 1.4-3.5 eV, even more typically 1.7-3.2 eV). Upon illumination with electromagnetic radiation equal or higher than the bandgap, the valence band electron is excited to the conduction band leaving an electron hole in the valence band. The formed exciton (electron-electron hole pair) then radiatively recombines in the form of photoluminescence, with maximum intensity centered around the LC bandgap value and exhibiting photoluminescence quantum yield of at least 1%. In contact with external electron and electron hole sources LC could exhibit electroluminescence.

The term "quantum dot" (QD) is known and particularly relates to semiconductor nanocrystals, which have a diameter typically between 2-10 nm. In this range, the physical radius of the QD is smaller than the bulk excitation Bohr radius, causing quantum confinement effect to predominate. As a result, the electronic states of the QD, and therefore the bandgap, are a function of the QD composition and physical size, i.e. the color of absorption/emission is linked with the QD size. The optical quality of the QDs sample is directly linked with their homogeneity (more monodisperse QDs will have smaller FWHM of the emission). When QD reach size bigger than the Bohr radius the quantum confinement effect is hindered and the sample may not be luminescent anymore as nonradiative pathways for exciton recombination may become dominant. Thus, QDs are a specific subgroup of nanocrystals, defined in particular by its size and size distribution. Typical quantum dot compositions comprise Cadmium or Indium, for example in the form of Cadmium Selenide (CdSe) Indium Phosphide (InP).

The term "core-shell crystals" is known and particularly relates to quantum dots, typically having a CdSe core or InP core having an additional shell typically comprising Zinc Sulfide (ZnS), Zinc Selenide (ZnSe), Cadmium Sulfide (CdS) or combinations thereof.

The term "core-shell quantum dot platelets" is known and particularly relates to core-shell quantum dots having platelet structure. The aspect ratio of the platelets (longest: shortest direction) of all 3 orthogonal dimensions is 2-50, preferably 3-20, most preferably 4-15.

The term "perovskite crystals" is known and particularly includes crystalline compounds of the perovskite structure. Such perovskite structures are known per se and described as cubic, pseudocubic, tetragonal or orthorhombic crystals of general formula M1M2X3, where M1 are cations of coordination number 12 (cuboctaeder) and M2 are cations of coordination number 6 (octaeder) and X are anions in cubic, pseudocubic, tetragonal or orthorhombic positions of the lattice. In these structures, selected cations or anions may be replaced by other ions (stochastic or regularly up to 30 atom-%), thereby resulting in doped perovskites or nonstochiometric perovskites, still maintaining its original crystalline structure. Preferably, luminescent perovskite crystals are approximately isometric (such as spherical or cubic). Particles are considered approximately isometric, in case the aspect ratio (longest:shortest direction) of all 3 orthogonal dimensions is 1-2. Accordingly, an assembly of LCs preferably contains 50-100% (n/n), preferably 66-100% (n/n) much preferably 75-100% (n/n) isometric nanocrystals.

The manufacturing of such luminescent perovskite crystals is known, e.g. from WO2018 028869.

The term "polymer" is known and includes organic and inorganic synthetic materials comprising repeating units ("monomers"). The term polymers includes homopolymers and co-polymers. Further, cross-linked polymers and non-cross-linked polymers are included. Depending on the context, the term polymer shall include its monomers and oligomers. Polymers include, by way of example, acrylate polymers, carbonate polymers, sulfone polymers, epoxy polymers, vinyl polymers, urethane polymers, imide polymers, ester polymers, furane polymers, melamine polymers, styrene polymers, norbornene polymers, silazane polymers, silicone polymers and cyclic olefin copolymers. Polymers may include, as conventional in the field, other materials such as polymerization initiators, stabilizers, fillers, solvents.

Polymers may be further characterized by physical parameters, such as polarity, glass transition temperature Tg, Young's modulus and light transmittance.

Transmittance: Typically, polymers used in the context of this invention are light transmissive for visible light, i.e. non-opaque for allowing light emitted by the luminescent crystals, and possible light of a light source used for exciting the luminescent crystals to pass. Light transmittance may be determined by white light interferometry or UV-Vis spectrometry.

Glass transition temperature: (Tg) is a well-established parameter in the field of polymers; it describes the temperature where an amorphous or semi-crystalline polymer changes from a glassy (hard) state to a more pliable, compliant or rubbery state. Polymers with high Tg are considered "hard", while polymers with low Tg are considered "soft". On a molecular level, Tg is not a discrete thermodynamic transition, but a temperature range over which the mobility of the polymer chains increase significantly. The convention, however, is to report a single temperature defined as the mid-point of the temperature range, bounded by the tangents to the two flat regions of the heat flow curve of the DSC measurement. Tg may be determined according to DIN EN ISO 11357-2 or ASTM E1356 using DSC. This method is particularly suitable if the polymer is present in the form of bulk material. Alternatively, Tg may be deter-mined by measuring temperature-dependent micro- or nanohardness with micro- or nanoindentation according to ISO 14577-1 or ASTM E2546-15. This method is suited for luminescent components and lighting devices as disclosed herein. Suitable analytical equipment is available as MHT (Anton Paar), Hysitron TI Premier (Bruker) or Nano Indenter G200 (Keysight Technologies). Data obtained by temperature controlled micro- and nanoindentation can be converted to Tg. Typically, the plastic deformation work or Young's modulus or hardness is measured as a function of temperature and Tg is the temperature where these parameters change significantly.

Young's modulus or Young modulus or Elasticity modulus is a mechanical property that measures the stiffness of a solid material. It defines the relationship between stress (force per unit area) and strain (proportional deformation) in a material in the linear elasticity regime of a uniaxial deformation.

A first aspect of the invention refers to a solid polymer composition comprising green luminescent crystals, red luminescent crystals, and a polymer. The green luminescent crystals are perovskite crystals selected from compounds of formula (I):

$$[M^1A^1]_a M^2_b X_c \qquad \text{(I), wherein:}$$

$A^1$ represents one or more organic cations, in particular formamidinium (FA), $M^1$ represents one or more alkaline metals, in particular Cs, $M^2$ represents one or more metals other than $M^1$, in particular Pb, X represents one or more anions selected from the group consisting of halides, pseudohalides and sulfides, in particular Br, a represents 1-4, b represents 1-2, c represents 3-9, and wherein either $M^1$, or $A^1$, or $M^1$ and $A^1$ being present.

In a further advantageous embodiment of the invention the green luminescent crystals are green luminescent perovskite crystals of formula (I'):

$$FAPbBr_3 \qquad \text{(I').}$$

In particular, formula (I) describes perovskite luminescent crystals, which, upon absorption of blue light, emit light of a wavelength in the green light spectrum between 500 nm and 550 nm, in particular centered around 527 nm.

Red luminescent crystals are known, such crystals emit red light (630 nm+/−30 nm) in response to excitation by light of a shorter wavelength. Suitable crystals are selected from the group of II-VI semiconductor compounds and from the group of III-V semiconductor compounds.

In embodiments, the crystals crystallize either in the zincblende lattice structure (zincblende crystals") or in the wurzite crystal structure (wurzite crystals"), preferably in the zincblende-type. Both structures have in common the ratio cation:anion=1:1 where the anion forms a close-packing of equal spheres (hcp or fcp respectively) and the cation is located in tetraeder positions.

In embodiments, the crystals are selected from compounds of formula (II)

$[M^3M^{3\prime}][YY']$ (II), wherein:

$M^3$, $M^{3\prime}$ represent Al, Ga, In, in particular In and Y, Y' represent N, P, As, Sb, in particular P and M3', Y' may or may not be present (i.e. III-V semiconductor compounds)

or $M^3$, $M^{3\prime}$ represent Zn, Cd, Be in particular Cd, and Y, Y' represent S, Se, Te in particular Se, and M3', Y' may or may not be present (i.e. II-VI semiconductor compounds).

As apparent from the above, suitable crystals include binary compounds of formula (II-1), ternary compounds of formula (II-2) and (II-3) and quaternary compounds of formula (II-4)

$[M^3][Y]$ (II-1), wherein:

$M^3$ and Y are as defined above, such as CdSe, InN, InP, InAs, and InSb;

$[M^3M^{3\prime}][Y]$ (II-2), wherein:

$M^3$, $M^{3\prime}$, Y are as defined above and $M^3$, $M^{3\prime}$ are present, such as InGaP;

$[M^3][YY']$ (II-3), wherein:

$M^3$, Y. Y' are as defined above and $M^3$, Y, Y' are present, such as InPN, InPAs, and InPSb;

$[M^3M^{3\prime}][YY']$ (II-4), wherein:

$M^3$, $M^{3\prime}$, Y, Y' are as defined above and $M^3$, $M^{3\prime}$, Y, Y' are present, such as InGaPN, InGaPAs, and InGaPSb.

Suitable crystals may or may not be surrounded by a shell. Crystals surrounded by a shell are referred to as core-shell crystals. In such core-shell crystals, the compounds forming the core and the compounds forming the shell, differ.

Suitable crystals may or may not be doped by a dopant metal. Suitable dopants are known in the field and typically have a concentration in the range of 1 mol % or less.

The crystal size of the red luminescent crystals may vary over a broad range, but typically within 1-10 nm. Such crystals are referred as Quantum dots, thereby distinguishing from microcrystals. For II-VI semiconductor compounds, suitable ranges are 1-10 nm, preferably 3-8 nm. For III-V semiconductor compounds, suitable ranges are 1-8 nm, preferably 2-4 nm.

Preferably, the luminescent crystals show a monodisperse size distribution. In the context of this invention, the term "monodisperse" refers to a population of quantum dots wherein at least about 60% of the population, preferably 75% to 90% of the population, or any integer or noninteger there between, falls within a specified particle size range. A population of monodispersed particles deviates less than 20% root-mean-square (rms) in diameter, more preferably less than 10% rms, and most preferably, less than 5% rms. Particle size and particle size distribution may be determined by microscopy.

The morphology of the crystals may vary, platelet-type, cubic, spherical, multi-faceted.

In a further advantageous embodiment of the invention, the red luminescent crystals are of core-shell type with the core as defined in claim 1 and the shell of formula (III):

$M^4Z$ (III), wherein:

$M^4$ represents Zn or Cd, preferably Zn, and
Z represents S, Se, Te, and wherein
compounds of formula (III) and formula (II) differ.

The shell includes single shell and multishell structures.

In a further advantageous embodiment of the invention, the red luminescent crystals comprise a core selected from the group consisting of InP and CdSe.

In addition, the red luminescent crystals comprise a single shell selected from the group consisting of ZnS, ZnSe, ZnSeS and ZnTe. Specific examples include InP@ZnS, InP@ZnSe, InP@ZnSeS, InP@ZnSeS, InP@ZnSe@ZnS, CdSe@ZnS and CdSe@ZnSe, particularly InP@ZnSeS.

In addition, the red luminescent crystals comprise a multishell selected from a combination of compounds selected from the group consisting of ZnS, ZnSe, ZnSeS and ZnTe. Specific examples include InP/ZnSe/ZnS (multishell) and InP/ZnSeS/ZnS (multishell).

In a further advantageous embodiment, the red luminescent crystals comprise a CdSe core which is alloyed/doped with Zn. This embodiment allows to reduce the amount of Cd per quantum dot.

In a further advantageous embodiment of the invention, the concentration of $M^2$ is 100-1000 ppm preferably 300-1000 ppm, very preferably 500-1000 ppm and/or the concentration of $M^3+M^{3\prime}$ is 300-2'500 ppm, preferably 600-2'000 ppm, very preferably 1'200-1'700 ppm and/or the red core-shell quantum dots have a platelet structure.

In a further advantageous embodiment of the invention, the concentration of $M^3+M^{3\prime}$ is >300 ppm, preferably >600 ppm, most preferably >1'200 ppm and/or the red core-shell quantum dots have a platelet structure.

The solid polymer composition according to a further advantageous embodiment of the invention, wherein the red core-shell quantum dots have a particular size $s_p$ of 1 nm≤$s_p$≤10 nm, in particular 3 mn≤$s_p$≤8 nm, in particular 2 nm≤$s_p$≤6 nm, in particular 2 nm≤$s_p$≤4 nm.

In a further advantageous embodiment of the invention, the polymer has a molar ration of the sum of (oxygen+nitrogen) to carbon z, wherein z≤0.9, z≤0.75 in particular z≤0.4, in particular z≤0.3, in particular z≤0.25.

In a further advantageous embodiment, the polymer comprises acrylate, very particular wherein the polymer comprises a cyclic aliphatic acrylate.

In an advantageous embodiment the solid polymer comprises an acrylate selected from the list of isobornylacrylate (CAS 5888-33-5), isobornylmethacrylate (CAS 7534-94-3), dicyclopentanyl-acrylate (CAS 79637-74-4, FA-513AS (Hitachi Chemical, Japan)), dicyclopentanyl-methacrylate (CAS 34759-34-7, FA-513M (Hitachi Chemical, Japan)), 3,3,5-trimethyl cyclohexyl acrylate (CAS 86178-38-3), 3,3,5-trimethyl cyclohexyl methacrylate (CAS 7779-31-9), 4-tert-butylcyclohexyl acrylate (CAS 84100-23-2), 4-tert-Butylcyclohexyl methacrylate (CAS 46729-07-1).

In another advantageous embodiment, the solid polymer is cross-linked.

In another advantageous embodiment, the solid polymer comprises a multi-functional acrylate.

In a further advantageous embodiment, the solid polymer composition has a glass transition temperature $T_g$ of $T_g \leq 120°$ C., in particular of $T_g \leq 100°$ C., in particular of $T_g \leq 80°$ C., in particular of $T_g \leq 70°$ C.

Each $T_g$ is measured according to DIN EN ISO 11357-2:2014-07 during the second heating cycle and applying a heating rate of 20K/min, starting at −90° C. up to 250° C.

In a further advantageous embodiment of the invention, the solid polymer composition comprises scattering particles selected from the group consisting of metal oxide particles and polymer particles, preferably selected from the group consisting of $TiO_2$, $ZrO_2$, $Al_2O_3$ and organopolysiloxanes.

In a further advantageous embodiment of the invention, the solid polymer is semicrystalline.

In a further advantageous embodiment of the invention, the solid polymer has a melting temperature of <140° C., preferably <120° C., most preferably <100° C.

A second aspect of the invention refers to a self-supporting film comprising the solid polymer composition according to the first aspect of the invention.

The self-supporting film emits green and red light in response to excitation by light of a wavelength shorter than the emitted green light.

In an advantageous embodiment of the self-supporting film, the solid polymer composition is sandwiched between the two barrier layers. In particular, such sandwich arrangement refers to an arrangement in a horizontal direction with a barrier layer, the polymer and another barrier layer. The two barrier layers of the sandwich structure can be made of the same barrier layer material or of different barrier layer materials.

The technical effect of the barrier layers is to improve the stability of the luminescent perovskite crystals, in particular against oxygen or humidity.

In particular, such barrier layers are known in the field; typically comprising a material/a combination of materials with low water vapour transmission rate (WVTR) and/or low oxygen transmission rate (OTR). By selecting such materials, the degradation of the luminescent crystals in the component in response to being exposed to water vapor and/or oxygen is reduced or even avoided. Barrier layers or films preferably have a WVTR<10 (g)/(m^2*day) at a temperature of 40° C./90% r.h. and atmospheric pressure, more preferably less than 1 (g)/(m^2*day), and most preferably less than 0.1 (g)/((m^2*day).

In one embodiment, the barrier film may be permeable for oxygen and has an OTR (oxygen transmission rate)>0.1 (mL)/(m^2*day) at a temperature of 23° C./90% r.h. and atmospheric pressure, more preferably >1 (mL)/(m^2*day), most preferably >10 (mL)/(m^2*day).

In one embodiment, the barrier film has a thickness of >0.3 mm, preferably >1 mm, most preferably >3 mm.

In one embodiment, the barrier film is transmissive for light, i.e. transmittance visible light >80%, preferably >85%, most preferably >90%.

Suitable barrier films may be present in the form of a single layer. Such barrier films are known in the field and contain glass, ceramics, metal oxides and polymers. Suitable polymers may be selected from the group consisting of polyvinylidene chlorides (PVdC), cyclic olefin copolymer (COC), ethylene vinyl alcohol (EVOH), high-density polyethylene (HDPE), and polypropylene (PP); suitable inorganic materials may be selected from the group consisting of metal oxides, SiOx, SixNy, AlOx. Most preferably, a polymer humidity barrier material contains a material selected from the group of PVdC and COC.

Most advantageously, a polymer oxygen barrier material contains a material selected from EVOH polymers.

Suitable barrier films may be present in the form of multilayers. Such barrier films are known in the field and generally comprise a substrate, such as PET with a thickness in the range of 10-200 μm, and a thin inorganic layer comprising materials from the group of SiOx and AlOx or an organic layer based on liquid crystals which are embedded in a polymer matrix or an organic layer with a polymer having the desired barrier properties. Possible polymers for such organic layers com-prise for example PVdC, COC, EVOH.

A further advantageous embodiment of the invention refers to a self-supporting film having a haze $h_1$ of $10 \leq h_1 \leq 80\%$, preferably $20 \leq h_1 \leq 70\%$, most preferably $30 \leq h_1 \leq 60\%$; and/or a concentration of $M^2$
  of 5-200 mg/m², preferably 10-100 mg/m², 20-80 mg/m², most preferably 30-80 mg/m2; and/or
  a concentration of $M^3+M^{3'}$ 30-250 mg/m², preferably 60-200 mg/m², most preferably 120-170 mg/m².

In a further advantageous embodiment of the invention a concentration of $M^3+M^{3'}$ is >30 mg/m², preferably >60 mg/m², most preferably >120 mg/m².

In a further advantageous embodiment of the invention, the self-supporting film has a haze $h_2$ of $h_2$ 80%, preferably $h_2 \leq 70\%$, very preferably $h_2 \leq 60\%$.

In a further advantageous embodiment of the invention, the self-supporting film has a haze $h_2$ of $10\% \leq h_2 \leq 80\%$, preferably $20\% \leq h_2 \leq 70\%$, very preferably $30\% \leq h_2 \leq 60\%$.

Haze in the context of the present invention means transmission haze. Transmission haze is the amount of light that is subject to Wide Angle Scattering, normally at an angle greater than 2.5° from normal incident direction (measured by ASTM D1003; e.g. with BYK Gardner haze meter) when passing a transparent material (the self-supporting film in this invention).

The low haze of the self-supporting film has the technical effect that the luminescent perovskite crystals in the self-supporting film are more stable, in particular if they are exposed to a blue light source. The stability is a result of the reduced multiplex scattering of the blue light in the self-supporting film due to the lower haze.

In addition, a further technical effect of the low haze is the fact that the lower haze leads to a higher display brightness, measured as "light conversion factor" (LCF) of the self-supporting film. The light conversion factor of the self-supporting film refers to the ratio between the green light intensity emitted in perpendicular direction from the self-supporting film and the blue light intensity extincted (e.g. by absorption, reflection or scattering) in a direction perpendicular of the self-supporting film.

In a further advantageous embodiment, such a self-supporting film can have a thickness of typically 0.005-10 mm, more typically 0.05-3 mm, most typically 0.01-0.5 mm.

In a further advantageous embodiment of the self-supporting film, the green luminescent crystals are arranged in a first region of the solid polymer composition and the red luminescent crystals are arranged in a second region of the solid polymer composition.

In particular, the first region and the second region are adapted to form layers adjacent to each other. In a further advantageous embodiment, the first and the second region might be arranged spaced from each other.

A third aspect of the invention refers to a light emitting device, in particular a liquid crystal display (LCD).

Advantageously, the light emitting device comprises the solid polymer composition according to the first aspect of the invention.

In a further advantageous embodiment, the light emitting device comprises the self-supporting film according to the second aspect of the invention.

A further advantageous embodiment of the light emitting device comprises an array of more than one blue LED. In addition, the array of LEDs covers essentially the full liquid crystal display area. The diffusor plate is arranged between the array of the more than one blue LED and the self-supporting film.

In a further advantageous embodiment of the invention, the one or more blue LEDs of the array are each adapted to switch between on and off with a frequency f of f≥150 Hz, preferably of f≥300 Hz, very preferably of f≥600 Hz.

Other advantageous embodiments are listed in the dependent claims as well as in the description below.

BRIEF DESCRIPTION OF THE DRAWINGS

The invention will be better understood and objects other than those set forth above will become apparent from the following detailed description thereof.

Such description makes reference to the annexed drawings, wherein:

FIG. 1 shows a schematic of a solid polymer composition according to an embodiment of the invention;

FIG. 2 shows a schematic of a self-supporting film according to an embodiment of the invention;

FIG. 3 shows a light emitting device according to an embodiment of the invention.

MODES FOR CARRYING OUT THE INVENTION

Figure 4:
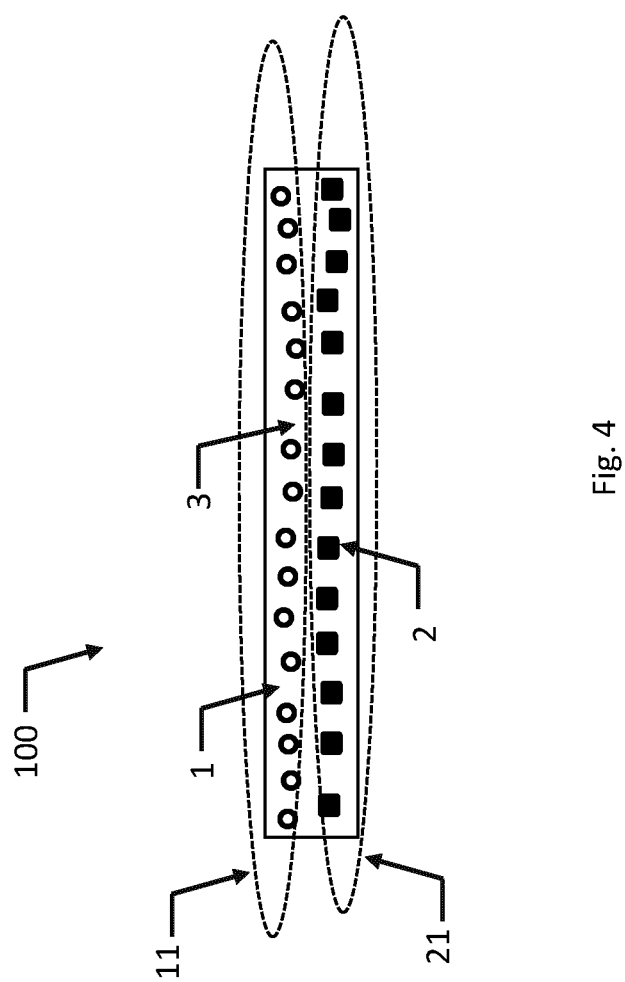
FIG. 4 shows a schematic of a self-supporting film according to a further advantageous embodiment of the invention.

Embodiments, examples, experiments representing or leading to embodiments, aspects and advantages of the invention will be better understood from the following detailed description thereof. Such description makes reference to the annexed drawings, wherein:

FIG. 1 shows a schematic of a solid polymer composition 100 according to an embodiment of the first aspect, wherein the solid polymer composition comprises green luminescent crystals 1 of formula (I), red luminescent crystals 2 of formula (II), and a polymer 3.

Further embodiments of the solid polymer composition in FIG. 1 might comprise further features according to the first aspect of the invention.

FIG. 2 shows a schematic of an embodiment of a self-supporting film according to the second aspect of the invention. In an advantageous embodiment as demonstrated in the figure, the self-supporting film might comprise barrier layers 4 that sandwich the solid polymer composition 100.

FIG. 3 shows a schematic of an embodiment of a light emitting device, in particular a liquid crystal display (LCD) according to the third aspect of the invention. Advantageously, the light emitting device comprises a solid polymer composition 100 as shown in FIG. 1 or a self-supporting film as shown in FIG. 2. Advantageously, the light emitting device comprises more than one blue LED 6, wherein the LEDs covers essentially the full liquid crystal display area 5. In particular, a diffusor plate is arranged between the array of more than one blue LED and the self-supporting film (the diffusor plate is not shown in the figure).

In particular, the light emitting device might emit light in RGB colours (aa, bb, cc).

FIG. 4 shows a further advantageous embodiment of the self-supporting film according to the second aspect of the invention. The green luminescent crystals 1 in this embodiment are arranged in a first region 11 of the self-supporting film. The red luminescent crystals 2 are arranged in a second region 21 of the self-supporting film.

The first region 11 and the second region 21 form layers adjacent to each other.

EXPERIMENTAL SECTION

Example 1: Preparation of a Self-Supporting Film with a Polymer Having a Low Glass Transition Temperature and Low Haze Green perovskite luminescent crystals with composition formamidinium lead tribromide ($FAPbBr_3$) are synthesized in toluene as following: Formamidinium lead tribromide ($FAPbBr_3$) was synthesized by milling $PbBr_2$ and FABr. Namely, 16 mmol $PbBr_2$ (5.87 g, 98% ABCR, Karlsruhe (DE)) and 16 mmol FABr (2.00 g, Greatcell Solar Materials, Queanbeyan, (AU)) were milled with Yttrium stabilized zirconia beads (5 mm diameter) for 6 h to obtain pure cubic $FAPbBr_3$, confirmed by XRD. The orange $FAPbBr_3$ powder was added to Oleylamine (80-90, Acros Organics, Geel (BE)) (weight ratio $FAPbBr_3$:Oleylamine=100:15) and toluene (>99.5%, puriss, Sigma Aldrich). The final concentration of $FAPbBr_3$ was 1 wt %. The mixture was then dispersed by ball milling using yttrium stabilized zirconia beads with a diameter size of 200 μm at ambient conditions (if not otherwise defined, the atmospheric conditions for all experiments are: 35° C., 1 atm, in air) for a period of 1 h yielding an ink with green luminescence.

Film formation: 0.1 g of the green ink was mixed with an UV curable monomer/crosslinker mixture (0.7 g FA-513AS, Hitachi Chemical, Japan/0.3 g Miramer M240, Miwon, Korea) containing 1 wt % photoinitiator Diphenyl(2,4,6-trimethylbenzoyl) phosphine oxide (TCI Europe, Netherlands) and 2 wt % polymeric scattering particles (Organopolysiloxane, ShinEtsu, KMP-590) and red luminescent crystals being isometric core-shell QDs having an InP core and a ZnS shell suspended in toluene in a speed mixer and the toluene was evaporated by vacuum (<0.01 mbar) at room temperature. The resulting mixture was then coated with 50 micron layer thickness on a 100 micron barrier film (supplier: I-components (Korea); Product: TBF-1007), then laminated with a second barrier film of the same type. Afterwards the laminate structure was UV-cured for 60 s (UVAcube100 equipped with a mercury lamp and quartz filter, Hoenle, Germany). The concentration of Pb in the cured layer (without the barriers) was 500 ppm Pb and the Pb loading per area was 30 mg Pb/$m^2$. The concentration of In in the cured layer (without the barriers) was 1300 ppm In and the In loading per area was 80 mg In/$m^2$. The initial performance of the as obtained film showed a green emission wavelength of 526 nm with a FWHM of 22 nm and a red emission wavelength of 630 nm with a FWHM of 20 nm. The color coordinates (CIE1931) of the film were x=0.25 and y=0.20 when placed on a blue LED light source (450 nm emission wavelength) with two crossed prism sheets (X-BEF) and one brightness enhancement film (DBEF) on top of the QD film (optical properties measured with a Konica Minolta CS-2000). The haze of the obtained film was 50% and the transmittance was 85% (measured with BYK Gardner haze meter). The light conversion factor of the film was 49% (LCF; LCF=emitted green intensity (integrated emission peak) divided by the reduction of the blue intensity (integrated emission peak); measured with perpendicular emission of green and blue from the QD film by using a Konica Minolta CS-2000). The glass transition temperature Tg of the UV-cured solid polymer composition was determined by DSC according to DIN EN ISO 11357-2:2014-07 with a starting temperature of −90° C. and an end temperature of 250° C. and a heating rate of 20 K/min in nitrogen atmosphere (20 ml/min). The purging gas was nitrogen (5.0) at 20 ml/min. The DSC system DSC 204 F1 Phoenix (Netzsch) was used. The $T_g$ was determined on the second heating cycle (the first heating from −90° C. to 250° C. showed overlaying effects besides the glass transition). For the DSC measurement, the solid polymer composition was removed from the film by delaminating the barrier films. The measured Tg of the UV-cured resin composition was 75° C.

The stability of the film was tested for 150 hours under blue LED light irradiation by placing the film into a light box with high blue intensity (supplier: Hoenle; model: LED CUBE 100 IC) with a blue flux on the film of 410 mW/cm$^2$ at a film temperature of 50° C. Furthermore the film was also tested for 150 hours in a climate chamber with 60° C. and 90% relative humidity. The change of optical parameters after stability testing of the film for was measured with the same procedure as for measuring the initial performance (described above). The change of optical parameters were as following:

| test condition | x-value (—) | y-value (—) | Luminanance (%) |
| --- | --- | --- | --- |
| initial | 0.25 | 0.20 | 100% |
| 150 h high flux (410 mW/cm$^2$) | 0.24 | 0.19 | 95% |
| 150 h 60° C./90% r.H. | 0.235 | 0.19 | 93% |

These results show that a self-supporting luminescent film could be obtained whereby the green perovskite crystals and red core-shell quantum dots both show a good chemical compatibility and high stability when tested under high blue flux and high temperature/humidity.

Comparative example 1 for example 1: Preparation of a self-supporting film with a polymer having a low glass transition temperature and high haze.

The procedure was the same as in the previous procedure in example 1, except the following parameters were changed:
  Only 50% of the green perovskite QDs and the red core-shell InP quantum dots were used
  12 wt % scattering particles KMP-590 were mixed into the UV curable acrylate mixture to increase the haze of the final QD film.

The as-obtained self-supporting film showed similar optical properties and Tg as in example 1 but with a haze of 95%, a transmittance of 80% and an LCF of 41%.

It can be seen that the LCF is lower than in experiment 1. A higher haze leads to a lower LCF and a lower haze leads to a higher LCF. Therefore, a lower haze of the QD film is beneficial to have a higher LCF and in turn a higher display efficiency (at specific comparable white point colour coordinates).

The concentration of Pb in the cured layer (without the barriers) was 250 ppm Pb and the Pb loading per area was 15 mg Pb/m$^2$. The concentration of In in the cured layer (without the barriers) was 650 ppm In and the In loading per area was 40 mg In/m$^2$.

The same stability tests were done again as in example 1 and the change of optical parameters were as following:

| test condition | x-value (—) | y-value (—) | Luminanance (%) |
| --- | --- | --- | --- |
| initial | 0.25 | 0.20 | 100% |
| 150 h high flux (410 mW/cm$^2$) | 0.24 | 0.17 | 75% |
| 150 h 60° C./90% r.H. | 0.235 | 0.19 | 93% |

These results show that a higher haze of the QD film leads to lower stability of the green perovskite crystals under high blue flux (decrease of green intensity as seen by the decrease of the y-value) compared to example 1, especially the green perovskite crystals are less stable under high blue flux. Therefore, it is advantageous to have a low haze of the QD film which leads to improved QD film stability under high blue flux in order to have stable colour coordinates and a stable white point during the operating lifetime of the display device.

Comparative example 2 for example 1: Preparation of a self-supporting film with a polymer having a high glass transition temperature and low haze.

The procedure was the same as in the procedure of example 1, except the acrylate monomer mixture (0.7 g FA-513AS, Hitachi Chemical, Japan/0.3 g Miramer M240, Miwon, Korea) was replaced by the following acrylate monomer mixture:

0.7 g FA-DCPA, Hitachi Chemical, Japan/0.3 g FA-320M, Hitachi Chemical, Japan

The as-obtained self-supporting film showed similar optical properties and haze as in example 1 but with a Tg of 140° C.

The concentration of Pb and In in the cured layer (without the barriers) was the same as in example 1.

The same stability tests were done again as in example 1 and the change of optical parameters were as following:

| test condition | x-value (—) | y-value (—) | Luminanance (%) |
| --- | --- | --- | --- |
| initial | 0.25 | 0.20 | 100% |
| 150 h high flux (410 mW/cm$^2$) | 0.24 | 0.15 | 52% |
| 150 h 60° C./90% r.H. | 0.235 | 0.19 | 94% |

These results show that a high $T_g$ of the solid polymer of the self-supporting film leads to lower stability of the green perovskite crystals under high blue flux (decrease of green intensity as seen by the decrease of the y-value) compared to example 1. Therefore it is advantageous to have a low $T_g$ of the QD film which leads to improved QD film stability under high blue flux in order to have stable colour coordinates and a stable white point during the operating life-time of the display device.

Example 2: Preparation of a Self-Supporting Film with a Low Haze and Whereby the Red Core-Shell Quantum Dots and the Green Perovskite Crystals are Spatially Separated The green perovskite QDs were used from example 1.

Film formation: 0.1 g of the green ink from example 1 was mixed with an UV curable monomer/crosslinker mixture (0.7 g FA-513AS, Hitachi Chemical, Japan/0.3 g Miramer M240, Miwon, Korea) containing 1 wt % photoinitiator Diphenyl(2,4,6-trimethylbenzoyl) phosphine oxide (TCI Europe, Netherlands) and 2 wt % polymeric scattering particles (Organopolysiloxane, ShinEtsu, KMP-590) in a speed mixer and the toluene was evaporated by vacuum (<0.01 mbar) at room temperature. The resulting mixture was then coated with 50 micron layer thickness on a 100 micron barrier film (supplier: I-components (Korea); Product: TBF-1007), then UV cured in a nitrogen atmosphere. Then a red coating formulation was prepared by mixing the red core-shell quantum dots with InP core and ZnS shell from experiment 1 (suspended in toluene) with an UV curable monomer/crosslinker mixture (0.7 g FA-DCPA, Hitachi Chemical, Japan/0.3 g Miramer M240, Miwon, Korea) containing 1 wt % photoinitiator Diphenyl(2,4,6-trimethylbenzoyl) phosphine oxide (TCI Europe, Netherlands) and 2 wt % polymeric scattering particles (Organopolysiloxane, ShinEtsu, KMP-590) in a speed mixer and the toluene was evaporated by vacuum (<0.01 mbar) at room temperature. The resulting mixture was then coated with 50 micron layer thickness on the previously deposited green layer, then a second barrier film was laminated on top and the total sandwich structure was UV-cured for 60 s (UVAcube100 equipped with a mercury lamp and quartz filter, Hoenle, Germany).

The final self-supporting film showed optical properties comparable to experiment 1.

The concentration of Pb in the cured green layer (without the barriers) was 500 ppm Pb and the Pb loading per area was 30 mg Pb/m2. The concentration of In in the cured red layer (without the barriers) was 1300 ppm In and the In loading per area was 80 mg In/m$^2$.

The change of optical parameters were as following:

| test condition | x-value (—) | y-value (—) | Luminanance (%) |
|---|---|---|---|
| initial | 0.25 | 0.20 | 100% |
| 150 h high flux (410 mW/cm$^2$) | 0.24 | 0.19 | 95% |
| 150 h 60° C./90% r.H. | 0.24 | 0.19 | 96% |

These results show that a self-supporting luminescent film could be obtained with a separated green layer and red layer whereby the green perovskite crystals and red core-shell quantum dots both show a high stability when tested under high blue flux and high temperature/humidity.

Example 3: Preparation of a Self-Supporting Film as in Example 1 but with Red Core-Shell Quantum Dot Platelets with a CdSe Core and a ZnS Shell The same experimental procedure was used as described in example 1, but with red core-shell quantum dot platelets with a CdSe core and a ZnS shell.

The concentration of Pb in the cured layer (without the barriers) was 500 ppm Pb and the Pb loading per area was 30 mg Pb/m$^2$. The concentration of Cd in the cured layer (without the barriers) was 500 ppm Cd and the Cd loading per area was 30 mg Cd/m$^2$.

The result was an optical performance and stability comparable to example 1.

Example 4: Preparation of a Self-Supporting Film as in Example 2 but with Red Core-Shell Quantum Dot Platelets with a CdSe Core and a ZnS Shell The same experimental procedure was used as described in example 2, but with red core-shell quantum dot platelets with a CdSe core and a ZnS shell.

The result was an optical performance and stability comparable to example 2.

The invention claimed is:

1. A self-supporting film having a thickness of 0.005-10 mm comprising
   green luminescent crystals
   red luminescent crystals, and
   a polymer,
   wherein the green luminescent crystals are perovskite crystals selected from compounds of formula (I):

$$[M^1A^1]_a M^2_b X_c \qquad \text{(I), wherein:}$$

$A^1$ represents one or more organic cations,
   $M^1$ represents one or more alkaline metals,
   $M^2$ represents one or more metals other than $M^1$,
   X represents one or more anions selected from the group consisting of halides, pseudohalides and sulfides,
   a represents 1-4,
   b represents 1-2,
   C represents 3-9, and
   wherein either $M^1$, or $A^1$, or $M^1$ and $A^1$ are present;
   wherein the red luminescent crystals are zincblende or wurzite, crystals selected from compounds of formula (II)

$$[M^3 M^{3\prime}][YY'] \qquad \text{(II), wherein:}$$

$M^3$, $M^{3\prime}$ represent Al, Ga, In, and
   Y, Y' represent N, P, As, Sb, and
   $M^{3\prime}$, Y' may or may not be present,
   or
   $M^3$, $M^{3\prime}$ represent Zn, Cd, Be, and
   Y, Y' represent S, Se, Te, and
   $M^{3\prime}$, Y' may or may not be present, and
   wherein a concentration of $M^2$ is 5-200 mg/m$^2$,
   wherein a concentration of $M^3 + M^{3\prime}$ is 30-250 mg/m$^2$,
   wherein the polymer comprises an acrylate,
   wherein the polymer has a molar ratio of the sum of (oxygen+nitrogen) to carbon z, wherein z≤0.4.

2. The self-supporting film according to claim 1, having a haze $h_1$ of 10≤$h_1$≤80%.

3. The self-supporting film according to claim 1, comprising scattering particles selected from the group consisting of metal oxide particles and polymer particles.

4. The self-supporting film according to claim 1, wherein the polymer is sandwiched between two barrier layers.

5. The self-supporting film according to claim 1, wherein the green luminescent crystals are perovskite crystals of formula (I'):

$$\text{FAPbBr}_3 \qquad \text{(I').}$$

6. The self-supporting film according to claim 1, wherein the red luminescent crystals are of the core-shell type, wherein the core is as defined in formula (II) and
wherein the shell comprises compounds of formula (III)

$$M^4Z \quad \text{(III), wherein:}$$

$M^4$ represents Zn or Cd, and
Z represents S, Se, Te, and wherein
compounds of formula (III) and formula (II) differ.

7. The self-supporting film according to claim 1, wherein the red luminescent crystals
comprise a core selected from the group consisting of InP and CdSe, and
comprise a shell or a multishell selected from the group consisting of ZnS, ZnSe, ZnSeS, and ZnTe, and combinations thereof.

8. The self-supporting film according to claim 1, wherein the green luminescent crystals are arranged in a first region of the self-supporting film and the red luminescent crystals are arranged in a second region of the self-supporting film.

9. A solid polymer composition, comprising
green luminescent crystals,
red luminescent crystals, and
a polymer,
wherein the green luminescent crystals are perovskite crystals selected from compounds of formula (I):

$$[M^1A^1]_aM^2{}_bX_c \quad \text{(I), wherein:}$$

$A^1$ represents one or more organic cations,
$M^1$ represents one or more alkaline metals,
$M^2$ represents one or more metals other than $M^1$,
X represents one or more anions selected from the group consisting of halides, pseudohalides and sulfides,
a represents 1-4,
b represents 1-2,
C represents 3-9, and
wherein either $M^1$, or $A^1$, or $M^1$ and $A^1$ are present;
wherein the red luminescent crystals are zincblende or wurzite, crystals selected from compounds of formula (II)

$$[M^3M^{3\prime}][YY'] \quad \text{(II), wherein:}$$

$M^3$, $M^{3\prime}$ represent Al, Ga, In, and
Y, Y' represent N, P, As, Sb, and
$M^{3\prime}$, Y' may or may not be present,
or
$M^3$, $M^{3\prime}$ represent Zn, Cd, Be, and
Y, Y' represent S, Se, Te, and
$M^{3\prime}$, Y' may or may not be present and
wherein the concentration of $M^2$ is 100-1000 ppm.

10. The solid polymer composition according to claim 9, wherein the green luminescent crystals (1) are perovskite crystals of formula (I'):

$$FAPbBr_3 \quad \text{(I').}$$

11. The solid polymer composition according to claim 9, wherein the red luminescent crystals are of the core-shell type,
and
wherein the shell comprises compounds of formula (III)

$$M_4Z \quad \text{(III), wherein:}$$

$M^4$ represents Zn or Cd, and
Z represents S, Se, Te, and wherein
compounds of formula (III) and formula (II) differ.

12. The solid polymer composition according to claim 9, wherein the red luminescent crystals
comprise a core selected from the group consisting of InP and CdSe, and
comprise a shell or a multishell selected from the group consisting of ZnS, ZnSe, ZnSeS, and ZnTe, and combinations thereof.

13. The solid polymer composition according to claim 9, wherein
the concentration of $M^3+M^{3\prime}$ is 300-2500 ppm, and/or
the red luminescent crystals have a platelet structure.

14. The solid polymer composition according to claim 9, wherein the polymer comprises an acrylate.

15. The solid polymer composition according to claim 9, wherein the solid polymer composition has a glass transition temperature $T_g$ of $T_g \leq 120°$ C.

16. The solid polymer composition according to claim 9, wherein the solid polymer composition comprises scattering particles selected from the group consisting of metal oxide particles and polymer particles.

17. A light emitting device,
comprising the self-supporting film according to claim 1.

18. The light emitting device according to claim 17 comprising an array of more than one blue LED,
wherein the array of LEDs covers essentially the full liquid crystal display area, and
wherein a diffusor plate is arranged between the array of more than one blue LED and the self-supporting film.

* * * * *